United States Patent [19]
Arnold

[11] Patent Number: 5,081,572
[45] Date of Patent: Jan. 14, 1992

[54] MANIPULATION OF TIME-ORDERED LISTS AND INSTRUCTIONS THEREFOR

[76] Inventor: Michael E. Arnold, 126 Sylvan School Rd., Snow Camp, N.C. 27349

[21] Appl. No.: 264,289

[22] Filed: Oct. 28, 1988

[51] Int. Cl.5 .............................................. G06F 9/312
[52] U.S. Cl. .................. 395/375; 364/244.3; 364/263.3; 364/259.2
[58] Field of Search ... 364/200 MS File, 900 MS File

[56] References Cited

U.S. PATENT DOCUMENTS

| | | | |
|---|---|---|---|
| 3,886,525 | 5/1975 | Brown et al. | 340/172.5 |
| 4,136,386 | 1/1979 | Aunumziata et al. | 364/200 |
| 4,320,455 | 3/1982 | Woods et al. | 364/200 |
| 4,394,727 | 7/1983 | Hoffman et al. | 364/200 |
| 4,482,956 | 11/1984 | Tallman | 364/300 |
| 4,584,640 | 4/1986 | MacGregor et al. | 364/200 |
| 4,604,694 | 8/1986 | Hough | 364/200 |
| 4,807,111 | 2/1989 | Cohen et al. | 364/200 |
| 4,858,116 | 8/1989 | Gillett et al. | 364/200 |

OTHER PUBLICATIONS

Conroy, "Hardware/Microcode Support of Queuing" IBM Technical Disclosure Bulletin, vol. 24, No. 1981, pp. 2716–2723.

IBM System/370 Extended Architecture Principles of Operation (SA22-7085-1), Jan. 1987, pp. A-40-A

*Primary Examiner*—David Y. Eng
*Attorney, Agent, or Firm*—Thomas F. Galvin; Jerry W. Herndon

[57] ABSTRACT

In multi-user (including multi-process) computing systems, Memory Access Serialization instructions are used to allow multiple processes to add and remove elements from a list without the usual software serialization requirements.

6 Claims, 8 Drawing Sheets

MANIPULATION OF TIME-ORDERED LISTS AND INSTRUCTIONS THEREFOR

BACKGROUND OF THE INVENTION

1. Field of the Invention

My invention relates to the manipulation of time-ordered lists in multiple processing units or multiple programmed computing systems, and more particularly to enable the addition or deletion of items without a locking mechanism, even when multiple processing units have asynchronous access to the lists. It also includes novel computer instructions for performing the list manipulations.

2. Background Art

My invention deals with both queues as well as stacks. In a queue, also termed a FIFO (first-in, first-out) list, the first item added to the list is the first to be removed. In a stack, also termed a LIFO (last-in, first-out) list, the last item added to the list is the first to be removed. Asynchronous manipulation of FIFO and LIFO lists is very common in operating system and sub-systems environments. The limitations imposed on these environments by the inability to quickly and easily manipulate time-ordered lists are becoming excessive. As the number of processors used in tightly coupled complexes continues to increase, the cost of serialization by software will also increase. Because of the high utilization of time-ordered lists, this cost is becoming prohibitively expensive.

Currently, there are two common methods of maintaining a FIFO list. For a single headed queue, the list is defined as having one anchor point, all elements are added using this point and are deleted by searching down the list and removing the last element. This method allows for multiple adders, but only a single deleter. It also requires that the deleter search to the end of the list, which may cause the deleter to be interrupted by page faults. The overhead associated with page faults that may be incurred can become excessive with long lists.

For a double headed queue, the list is defined as having two anchor points, and all elements are added using one point and deleted using the other. This second method only allows one adder or deleter to be accessing the list at a time. To assure that only one access is allowed at a time, some method of serialization (a locking mechanism) must be employed.

The first method may be impractical because of the performance implications of excessive paging. The second method has the restriction that a lock must be used; this requirement can also contribute to performance degradation.

Other specific examples of prior art systems and method include U.S. Pat. Nos. 4,394,727 and 4,320,455, and the article by Conroy in the IBM *Technical Disclosure Bulletin*, Vol. 24, November 1981, pages 2716 to 2723, all of which involve the use of a lock bit or lock word.

One technique for avoiding the use of locking mechanisms in some instances in multi-processing or multiprogrammed computing systems is described in U.S. Pat. No. 3,886,525, which is assigned to the same assignee as the present application.

The then novel technique described in U.S. Pat. No. 3,886,525 included the invention of a new instruction at that time called "Compare and Swap." Using this instruction, each user of shared data is permitted to access it at its addressable location in the shared data store for further processing by the sequence of program instructions. After processing, the processed data is to be returned to the address location of the shared data. Prior to returning the processed data to the address location in the share data store, the new instruction is accessed in the sequence of instructions. Using "Compare and Swap," the data content of the addressed location accessed by the instruction is compared with the data accessed from the addressed location prior to the processing. As a result of this comparison, it can be determined that during the period of processing on the shared data, another user has or has not also accessed the shared data for processing, and returned a different value of the shared data back to the addressed storage location. If, in response to the Compare and Swap (CS) instruction, it is determined that the value of the addressed location has been modified by another user, the modified value is retained by the user and the processing is reinitiated on the modified value. If the value of the data in the addressed location accessed by the CS instruction is still identical to the value of the data accessed by the user prior to processing, it can be determined that no other user had accessed shared data and modified it. Therefore, the processed data will be transferred to the addressed location and further processing permitted (see Col. 2, line 8-39 of U.S. Pat. No. 3,886,525).

The COMPARE AND SWAP (CS) and its companion COMPARE DOUBLE AND SWAP (CDS) instructions are now used in multi-programming and multi-processing environments to serialize access to counters, flags, control words and other common storage areas. The IBM System/370 Extended Architecture Principles of Operation, (IBM Publication No. SA22-7085-0), hereinafter referred to as the 370XA Prin. Ops on page A45, gives the following example of providing for multiple asynchronous unlocked adders and deleters. It is identified as Table I. The list comprises a standard S/370 program segment which is well known to those skilled in the art as 370 Assembler Language. The first column lists mnemonic labels, the second column is the operation or instruction field, the third column lists the operand field and the fourth column contains comments. This is a standard format well known to those of skill in the art.

TABLE I

| | | | |
|---|---|---|---|
| (Prior Art) | | | |
| ADD TO FREE LIST Routine | | | |
| Initial Conditions: | | | |
| GR2 contains the address of the element to be added. | | | |
| GR4 contains the address of the header. | | | |
| 1. ADDQ | LM | 0,1,0(4) | GR0,GR1 = contents of the header |
| 2. TRYAGN | ST | 0,0(2) | Point the new element to the top of the list |
| 3. | LR | 3,1 | Move the count to GR3 |
| 4. | BCTR | 3,0 | Decrement the count |
| 5. | CDS | 0,2,0(4) | Update the header |
| 6. | BC | 7,TRYAGN | |
| DELETE FROM FREE LIST Routine | | | |
| 7. DELETEQ | LM | 2,3,0(4) | GR2,GR3 = contents of the header |
| 8. TRYAGN | LTR | 2,2 | Is the list empty? |
| 9. | BC | 8,EMPTY | Yes, get help |
| 10. | L | 0,0(2) | No, GR0 = the pointer from the first element |
| 11. | LR | 1,3 | Move the count to GR1 |
| 12. | CDS | 2,0,0(4) | Update the header |
| 13. | BC | 7,TRYAGN | Update the header |
| 14. USE | (Any Instruction) | | The address of the |

TABLE I-continued
(Prior Art)

removed element is in

Copyright © IBM Corp. 1983

Probably the most significant point to note is that functions can be performed by programs running enabled for interruption (multiprogramming) or by programs that are running on a multi-processing configuration. In other words, the instructions CS and CDS allow a program to modify the contents of a storage location while running enabled, even though the routine may be interrupted by another program on the same CPU that will update the location, and even though the possibility exists that another CPU may simultaneously update the same location.

The CS instruction first checks the value of a storage location and then modifies it only if the value is what the program expects; normally, this would be a previously fetched value. If the value in storage is not what the program expects, then the location is not modified; instead, the current value of the location is loaded into a general register in preparation for the program to loop back and try again. During the execution of CS, no other CPU can access the specified location.

When a common storage area larger than a doubleword is to be updated, it is usually necessary to provide special interlocks to ensure that a single program at a time updates a common area. Such an area is called a serially reusable resource (SRR). In general, updating a list or even scanning a list, cannot be safely accomplished without locking the list. However, the CS instructions can be used in certain restricted situations to perform the lock/unlock functions and to provide sufficient queuing to resolve contentions, either in a LIFO or FIFO manner. A lock/unlock function can then be used as the interlock mechanism for updating an SRR of any complexity.

The lock/unlock functions are based on the use of a "header" associated with the SRR. The header is the common starting point for determining the states of the SRR, either free or in use, and also is used for queuing requests when contentions occur. Contentions are resolved using WAIT and POST. The general programming technique requires the program that encounters a "lock" SRR must "leave a mark on the wall," indicating the address of an ECB on which it will WAIT. The "unlocking program" sees the mark and POSTS the ECB, thereby permitting the WAITING program to continue. In most cases, all programs using a particular SRR must use either the LIFO queuing scheme or the FIFO scheme; the two are not mixed. When more complex queuing is required, the suggestion in the 370 XA Prin. Ops. manual is that the queue for the SRR delocks using one of the two methods shown.

As notes, the CS & CDS instructions have been used quite successfully. They enable users to obtain access to shared data or headers for the purpose of further processing. The need to prevent access to the addressed location when another user is processing data is eliminated by the CS instruction. However, the CS and CDS instructions apply only to a single word or a double word.

In contrast, as will be explained, the Compare and Swap Disjoint (CSD) and Compare and Load (CAL) instructions of my invention enable the referencing of two non-adjacent words (or double words in an expanded version).

SUMMARY OF THE INVENTION

It is therefore an object of my invention to allow unlocked asynchronous access to lists by multiple processing units or users.

It is a further object of my invention to do so while maintaining the integrity of the list.

It is a further object of my invention to improve the performance of maintaining such lists.

A still further object of my invention is to provide computer instructions which enable the objects related above and others to be performed.

These and other objects of my invention are achieved by novel procedures which include the creation of novel computer instructions, viz., "Compare and Swap Disjoint" and "compare and Load." The use of these memory-access-serialization instructions allows unlimited asynchronous manipulation of these lists by any number of adders and deleters. My method also allows the addition and deletion of elements to a time-ordered list of either FIFO or LIFO types by multiple processors while maintaining list integrity. The term "disjoint" means that the two words being acted upon are not adjacent to each other in storage. Another term for "disjoint" is "discontiguous".

The novel Compare and Load (CAL) instruction compares data in a first register with an address location and fetches into a second register the value from a second location based on the equality of the comparison. The advantage of this is that one can fetch a value from a location dependent on the fact that the contents of another location have not changed.

The novel Compare and Swap disjoint (CSD), as distinguished from the Compare and Swap (CS) instruction and the Compare Double and Swap (CDS) instructions, enables the program to refer to two non-adjacent words or double words; i.e., it allows for the simultaneous updating of two disjoint (discontiguous) storage locations. This aids in list manipulation because one must deal with two disjoint entities in many practical situations.

DESCRIPTION OF THE PREFERRED EMBODIMENT

I begin with a description of the two novel instructions and their operation—"compare and Load" and "compare and Swap Disjoint." The instructions are written in the format of the 370-XA Prin. Ops., but the methods have more general applications.

COMPARE AND LOAD ("CAL")
R1,D2(B2),R3,D4(B4)

| OP' | R1 | R3 | B2 | D2 | B4 | D4 |
|---|---|---|---|---|---|---|
| 0 | 8 | 12 | 16 | 20 | 32 | 36  47 |

Figure 1:
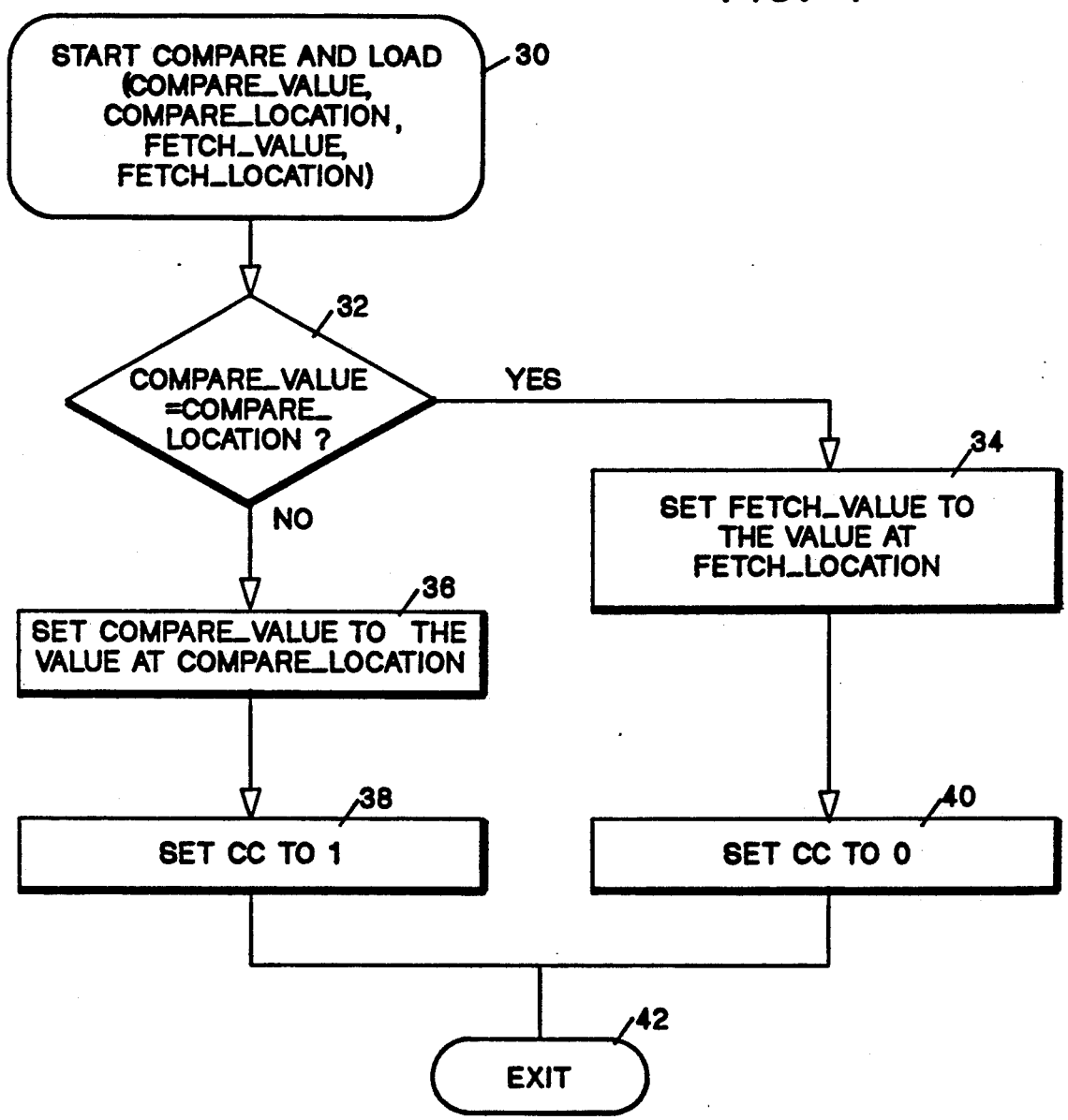
FIG. 1 is a flow diagram showing the operation of my novel Compare and Load instruction.

The foregoing description is set forth in relation to FIG. 1 of the drawing and the CAL format.

The addressable data specified by the Compare and Load instruction is depicted as follows:

The operation code in binary bits 0-7 will be decoded to signify the Compare and Load instruction. Four different operands are identified by address information in the remaining portions of the instruction. The five binary bits 8-11, designated R1, identify a general purpose register containing operand 1. The binary bits 12-15, designated R3, identify the general purpose register containing the processed data or operand 3. Binary bits 16-19, labeled B2, identify a general purpose register which contains base address information to which binary bits 20-31 of the instruction, labeled D2, are added to identify the addressed location in shared storage. Binary bits 32-35, labeled B4, identify a general purpose register which contains base address information to which binary bits 36-47, labeled D4, are added to identify the addressed location in shared storage.

In block 30, Compare_Value is Operand 1, R1, Compare Location is Operand 2, D2(B2), Fetch_Value is Operand 3, R3 and Fetch_Location is Operand 4, D4(B4). As will be discussed with respect to the queue manipulation processes, the two discontiguous or disjoint elements are, e.g., the head of a list and another element in the list.

The fullword at the second-operand location in storage D(B2) is compared with the first operand in R1 as shown in block 32 in FIG. 1. If they are equal, then the program fetches into the register (the third operand) R3, the fullword at the location defined by the fourth operand D4(B4) in storage as the base/displacement as shown in block 34. The Condition Code is set to 0 as shown in block 4.

In decision block 32, if the fullword at the second-operand location is not equal to the first operand, then the first operand is set equal to the second operand, the third operand remains unchanged, as shown in block 36, the fourth operand is not used; and the condition code (CC) is set to 1, as shown in block 38.

R1 and R3 each represent any general register means. The second and fourth operands are fullwords in storage designated on a word boundary.

Access exceptions are not recognized against the fourth operand if the second operand is not equal to the first. (In other words, no reference to the fourth operand location is made.)

When the second operand D2(B2) in storage is equal to the first operand in R1, no access by another CPU t the second operand is permitted between the moment that the second operand is fetched and the fourth operand is fetched. This type of step is commonly referred to as storage access serialization.

Serialization on each operand location is performed in step 32 before the value in that location is fetched, and again after the operation is completed. CPU operation is delayed until all previous accesses by this CPU to storage have been completed, as observed by channels and other CPUs, and then the second operand is fetched. If the comparison of the first and second operands are equal, then the fourth operand (D4)B4 is fetched. No subsequent instructions or their operands are accessed by this CPU until the execution of the CAL instruction is completed.

RESULTING CONDITION CODE (CC)

0 First and second operands are equal, and the third operand has been replaced by the fourth operand.
1 First and second operands are unequal. The first operand has been replaced by the second operand. The third and fourth operands are unchanged.
2 --
3 --

Program Exceptions

Access (fetch and store operands 2 and 4)
Operation

COMPARE AND SWAP DISJOINT (CSD)
CSD R1,D2(B2),R3,D4(B4)

| OP' | R1 | R3 | B2 | D2 | B4 | D4 |
|---|---|---|---|---|---|---|
| 0 | 8 | 12 | 16 | 20 | 32 | 36  47 |

Figure 2:
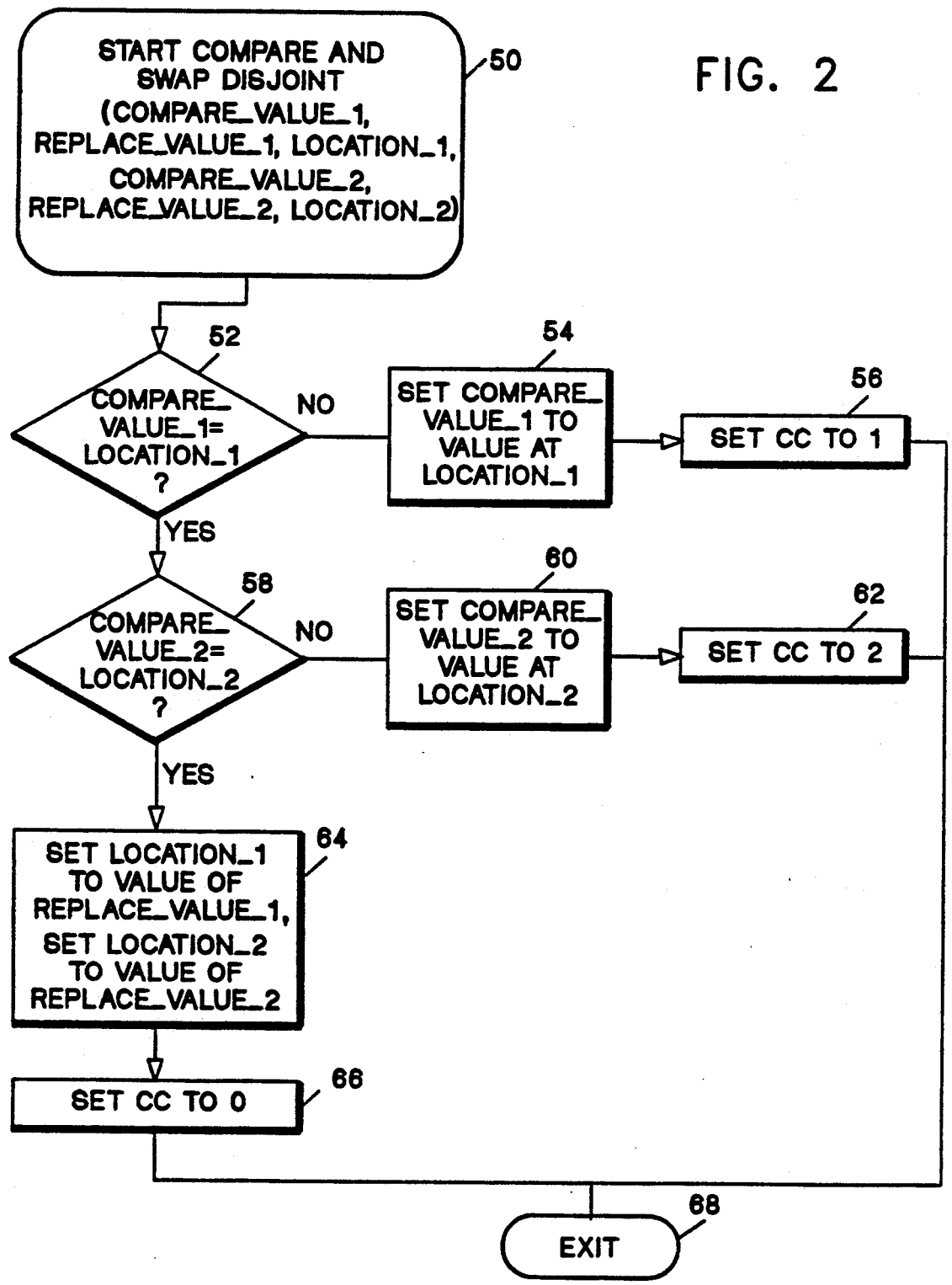
FIG. 2 is a flow diagram showing the operation of my novel Compare and Swap Disjoint instruction.

Referring to FIG. 2, the CSD process begins in block 50 with the general purpose being to compare the first and second operands and then the third and fourth operands under certain conditions. The first operand R1 and the second operand D2(B2) in storage are compared in decision block 52. If they are equal, the third operand in R3 and fourth operand D4(B4) in storage are compared in decision block 58. If they are also equal, the R1+1 operand (Replace Value 1) is stored at the second operand location (Location_1), and the R3+1 operand (Replace_Value_2) is stored at the fourth operand location as shown in block 64. The Condition Code is set to 0 as shown in block 66.

If the first operand R1 and the second operands D2(B2) are unequal, the second operand is loaded into the first operand in block 54. If the first and second operands are equal, and the third and fourth operands are unequal as decided in block 58, the fourth operand is loaded into the third operand as shown in block 60. The CC is set to 2 as shown in block 62.

R1 and R3 each represent an even-odd pair of general registers and designate an even-numbered register. R1+1 and R3+1 represent the odd-numbered register of the pair. The second operand D2(B2) and fourth operand D4(B4) are words in storage.

When the result of the comparison of the first and second operands is unequal, the second operand remains unchanged, and the fourth operand is not accessed. When the result of the comparison of the third and fourth operands is unequal, the second and fourth operands remain unchanged. Access exceptions are not recognized against the fourth operand if the first and second operands are unequal.

When both comparisons done in blocks 52 and 58 are equal, no access by another CPU to the second-operand or fourth-operand location is permitted between the moment that the respective operand is fetched for comparison and when it is stored.

Serialization on each operand location is performed before it is fetched in blocks 52 and 58, and again after the operation is completed at block 68. CPU operation is delayed until all previous accesses by this CPU to storage have been completed, as observed by channels and other CPUs, and then the second operand is fetched at block 52. If the first and second operands are equal, then the fourth operand is fetched at block 58. No subsequent instructions or their operands are accessed by this CPU until the execution of the CSD instruction is completed, including placing the result values, if any, in storage, as observed by channels and other CPUs.

The second and fourth are designated on a word boundary. The R1 and R3 fields each designate an even register. Otherwise, a specification exception is recognized.

RESULTING CC

0 First and second operands are equal, and third and fourth operands are equal. The second and fourth operands have been replaced.
1 First and second operands are unequal. The first operand has been replaced by the second operand. The third and fourth operands are unchanged.
2 First and second operands are equal, but the third and fourth operands are unequal. The third operand has been replaced by the fourth operand. The first and second operands are unchanged.
3 --

PROGRAM EXCEPTIONS

Access (fetch and store, operands 2 and 4)
Specification
Operation

Figure 3:
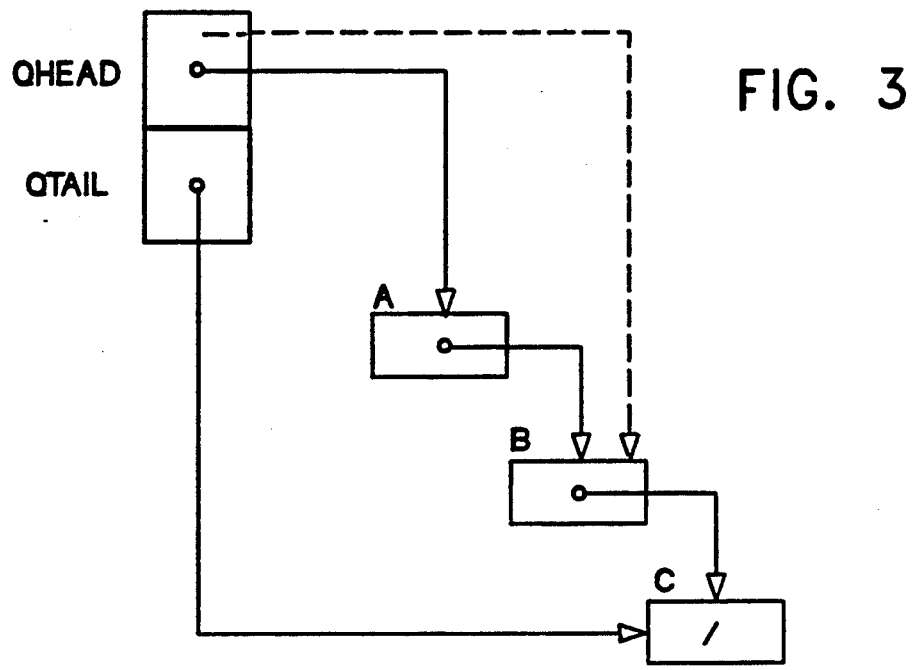
FIG. 3 illustrates a double-headed queue FIFO list and the result obtained after the manipulation of the list by my invention.

I turn now to illustrations of how my novel instructions may be productively used in the manipulation of time-ordered lists or queues. The queue is defined as having head and tail pointers. The elements are added to the tail and taken from the head of the queue. FIG. 3 illustrates the deletion of an element from a double-headed queue. As stated, the queue is defined as having Q_head (Q_head) and Q_tail (Q_tail) where the Q_head points to the oldest element in the queue and the Q_tail points to the newest element in the queue. The solid lines shown the list as it exists before it is manipulated. Given a representative queue with elements added in this order, A, B and C, to effect the deletion of element A, the Q_head pointer must be changed to point to element B as shown by the dotted line.

Figure 4A:
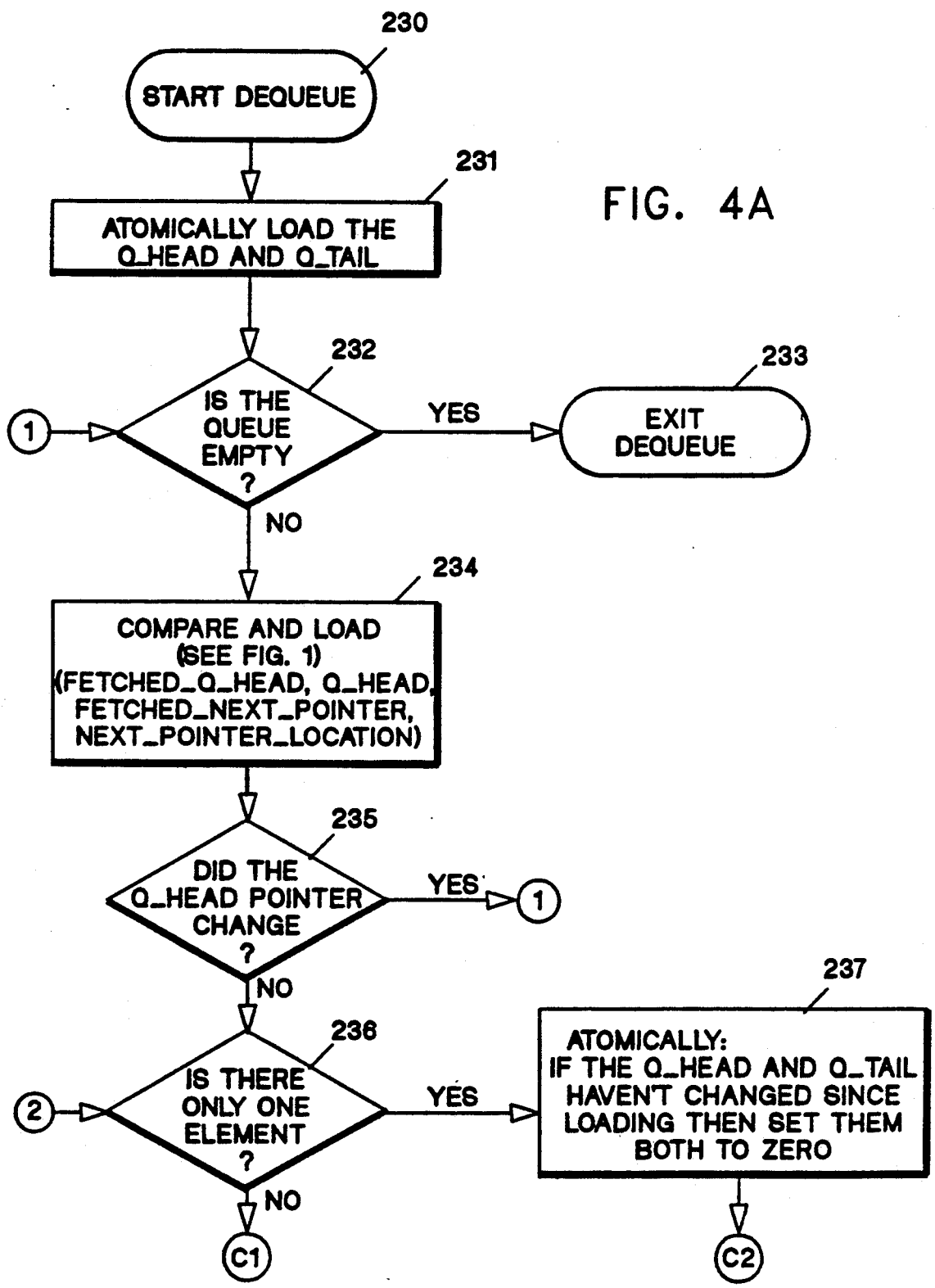
FIGS. 4A and 4B are flow diagrams illustrating the method according to my invention of deleting an element from the double-headed queue shown in FIG. 3.
Figure 4B:
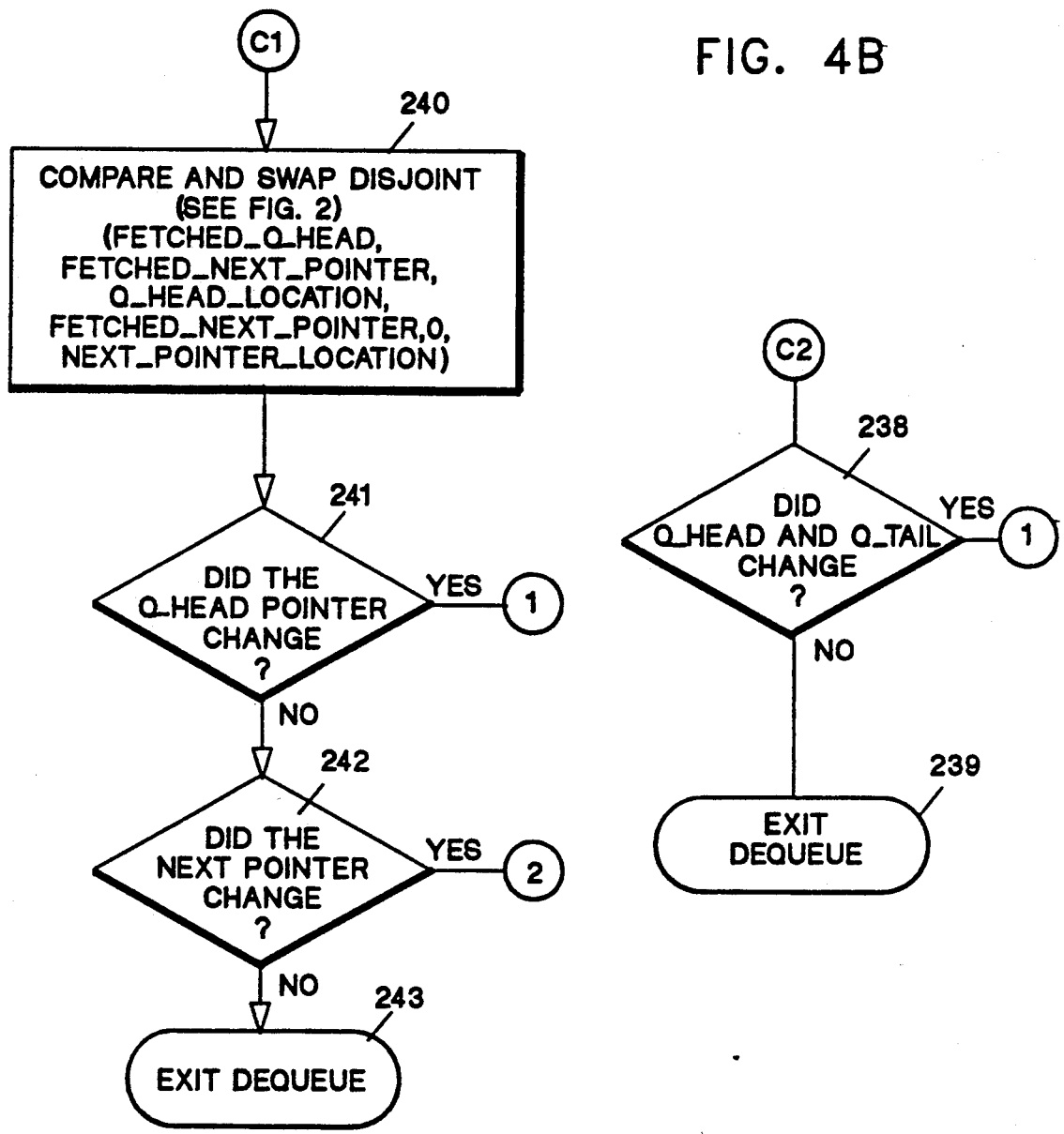

My method of accomplishing this in accordance with my invention is illustrated in FIGS. 4A and 4B and in that portion of instructions in Table II in this specification which relate to DEQUEUEING.

The queue is defined as having head and tail pointers. The elements are added to the tail and taken from the head of the queue.

The principal result of my method enables the replacement of the pointer in the Q_head and the replacement of the next pointer in element A without any possibility of modifications. This ensures that list integrity is maintained during the manipulation of the list.

LIST MANIPULATION

Following is a detailed description of allowing multiple processes to DEQUEUE and ENQUEUE elements concurrently, without having to hold a lock or to wait on an event control block (ECB), while still ensuring that the queue will not be corrupted. This is achieved by including the CAL and CSD instructions in the programs.

The QUEUE is defined as having Head and Tail pointers. The elements are added to the tail and taken from of the head of the queue. The functional definition is the same as a double headed queue in FIGS. 3 and 4. See the 370/XA Prin. Ops. for a description of the instructions used below. The explanation of the columns has already been given with respect to Table 1.

TABLE 2

| Assume the following declarations: | | | |
|---|---|---|---|
| 1. QUEUE | DS | 0F | |
| 2. QHEAD | DC | A(0) | Pointer to the head of the queue |
| 3. QTAIL | DC | A(0) | Pointer to the tail of the queue |
| 4. * | | | |
| 5. ELEMENT | DSECT | | A Queue Element |
| 6. NEXT | DS | A | Pointer to the next element on the queue |
| 7. ELEMENTL | EQU | *-ELEMENT | Length of ELEMENT |
| 8. * | | | |
| 9. NEWELEM | DS | CL(ELEMENTL) | A new element to add to the Queue |
| DEQUEUEing an element from the QUEUE. | | | |
| (Refer to FIG. 4 for the flow diagram.) | | | |
| 1. DEQUEUE | L | R2,QHEAD | Get the pointer to Head |
| 2. DEQ1 | LTR | R2,R2 | Anything there? (Load and Test) |
| 3. | BZ | DEQEXIT | No, so exit |
| 4. | CAL | R2,QHEAD,R4,NEXT-ELEMENT(R2)Set R4 QHEAD @NEXT | |
| 5. | BC | 4,DEQ1 | QHEAD changed, so try again |
| 6. DEQ2 | LTR | R4,R4 | Was the first element the only element? |
| 7. | BNZ | DEQ3 | No, So Dequeue with CSD |
| 8. | LR | R5,R4 | Yes, R5=R4=0 |
| 9. | LR | R3,R2 | The Tail MUST equal the Head pointer |
| 10. | CDS | R2,R4,QUEUE | Replace the queue pointers with zero |
| 11. | BC | 4,DEQ1 | If it didn't work, then try again |
| 12. | B | DEQEXIT | It worked, so indicate success and exit |
| 13. DEQ3 | LR | R3,R4 | Use the NEXT field to replace the QHEAD |
| 14. | SLR | R5,R5 | Replace the Next field with zero |
| 15. | CSD | R2,QHEAD,R4,NEXT-ELEMENT(R2) Update pointers | |
| 16. | BC | 4,DEQ1 | R2 =QHEAD, try again |
| 17. | BC | 2,DEQ2 | R4 =NEXT, try again |

TABLE 2-continued

Assume the following declarations:

| | | | |
|---|---|---|---|
| 18. DEQEXIT | DS | OH | If DEQEUEd R2=Element ELSE R2=0 |

ENQUEUEing an element to the QUEUE.
(Refer to FIG. 6 for the flow diagram.)

| | | | |
|---|---|---|---|
| 1. ENQUE | LA | R5,NEWELEM | Get the address of the new element |
| 2. ENQ1 | LM | R2,R3,QUEUE | Get the QHEAD & QTAIL pointers |
| 3. | LTR | R2,R2 | Is there anything on the QUEUE |
| 4. | BNZ | ENQ2 | Yes, so do normal enqueue |
| 5. | LR | R4,R5 | No, QHEAD & QTAIL must point to the New Element |
| 6. | CDS | R2,R4,QUEUE | Update the pointers |
| 7. | BC | 4,ENQ1 | It didn't work, so try it again |
| 8. | B | ENQEXIT | It did work, so exit |
| 9. ENQ2 | LR | R2,R3 | Pointer to Tail of QUEUE |
| 10. | LR | R3,R5 | Pointer to New Element |
| 11. | SLR | R4,R4 | Current Tail Element has a zero NEXT pointer |
| 12. | CSD | R2,QTAIL,R4,NEXT-ELEMENT(R2) | Update the pointers |
| 13. | BNZ | ENQ1 | It didn't work, try again |
| 14. ENQEXIT | DS | OH | |

Copyright © IBM Corp. 1987

Turning now to FIG. 4A, the program, DEQUEUE, removes an element from a double-headed FIFO list in accordance with my invention. The first step in the program, as shown in block 231, is to atomically load the Q_head and Q_tail with elements if there are any to be loaded. The program proceeds to block 232 to decide whether the queue is empty. If the answer is yes, the dequeue program is exited as shown in block 233. If the answer is no, the Compare and Load routine in block 234 is used to fetch the value of the next pointer from the oldest work element while making sure the Q_head does not change.

The next step in the process is to determine whether the Q_head pointer had changed as shown in decision block 235. If the answer is yes, the routine returns to decision block 232 to try to dequeue the next element.

CAL is used to fetch the value of the next pointer from the first element on the chain as addressed by the Q_head. This operation is performed while ensuring that that element has not been removed by another process executing the same CAL or dequeue operation. If it is detected that the Q_head has changed, which indicates that someone else has removed an element from the list, then the program must refetch the next query location as described above. If in fact the Q_head did not change, then the program does hold a valid next pointer location.

The next step in the process is to test the next pointer fetched according to block 234. If the next pointer was not zero, then more than one element exists, as determined in block 236, and the program then sets the replacement value for the Q_head to the next pointer fetched in clock 234. In block 237 the program sets the Q tail value to the same value as the Q_head value. While making sure the Q_head and Q_tail do not change (atomically), the Q_head and Q_tail are replaced with zeros.

If, on the other hand, the Q_head or Q_tail changed, the program returns to block 232 to test the Q_head again. If the Q_head and Q_tail did not change, then the program is exited with either zero or the address of the dequeued element as shown in block 243.

Turning to block 240 in FIG. 4B, while ensuring that the Q_head and next field do not change, the program replaces the value of the Q_head with the value of the second oldest element on the queue and replaces the value of the next pointer to zero. As indicated in the drawing, this is the use of the Compare and Swap Disjoint (CSD) instruction. In decision block 241 a decision is made as to whether the Q_head pointer had changed. If the pointer had changed the program returns to decision block 232 to determine whether or not the queue is empty. If the Q_head pointer had not changed, the program proceeds to decision block 242. The dequeue routine is exited as shown in block 243. This exit occurs with either zero or the address of the dequeued element.

Returning to decision block 236, if there had been only one element in the queue and if the Q_head and Q_tail have not changed since loading, then they are both set to zero. The program then proceeds to decision block 238 to determine whether the Q head and Q_tail changed. If the Q_head and Q_tail had changed, the process returns to step 232 to determine if the queue is empty. However, if the Q_head and Q_tail had not changed, the program is exited with the address of the dequeued element.

In using the CSD, the DEQUEUE program replaces the value of the Q_head and the value of the next pointer location on the first element of the chain, ensuring that they have not changed. CSD then replaces them with the address of the second element on the chain and with zero, respectively, ensuring that both the Q_head and the next pointer have not changed.

If the Q_head pointer changed or the next pointer changed, that indicate that either another element was added to the chain or during the time between the CAL and the CSD that someone else has removed an element from this queue. At that point the program reperforms the CAL instruction as shown above. If neither pointer changed, then the first element on the queue has now been removed and the process is successful.

Figure 5:
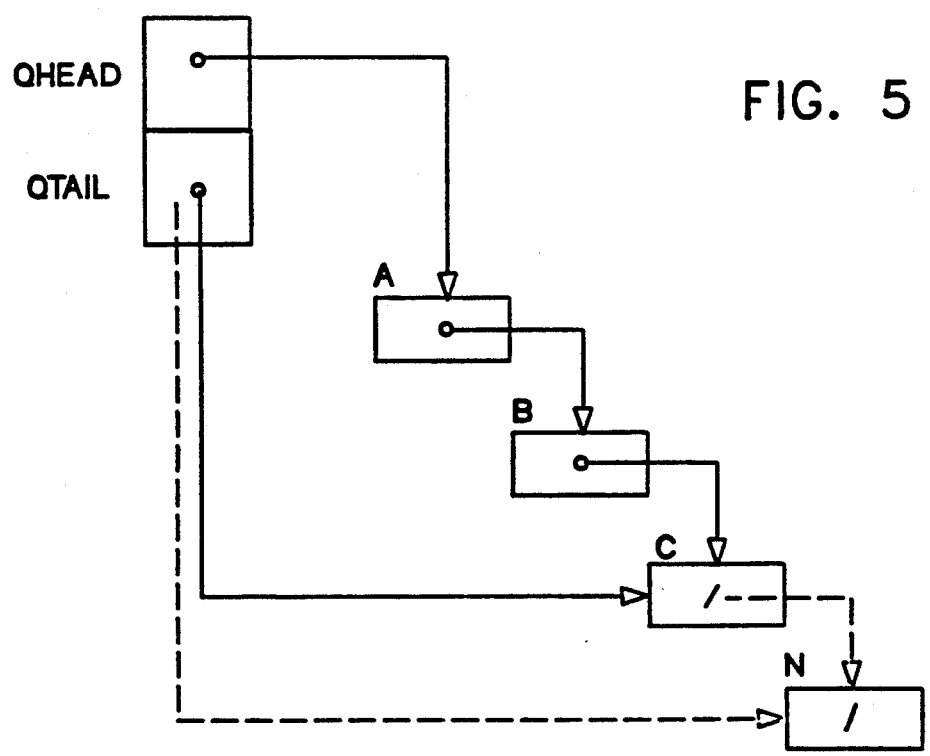
FIG. 5 illustrates adding an element to a double-headed queue in accordance with my invention.

FIG. 5 illustrates the addition of an element to a double-headed queue. The queue is defined as having a Q_head and a Q_tail, where the Q_head points to the oldest element in the queue and the Q_tail points to the newest element in the queue. Given a representative queue with elements added in this order: A, B and C, to effect the addition of element N, the Q_tail pointer must be changed to point to element N and the pointer from element C (C next pointer) must be changed to also point to element N.

Figure 6:
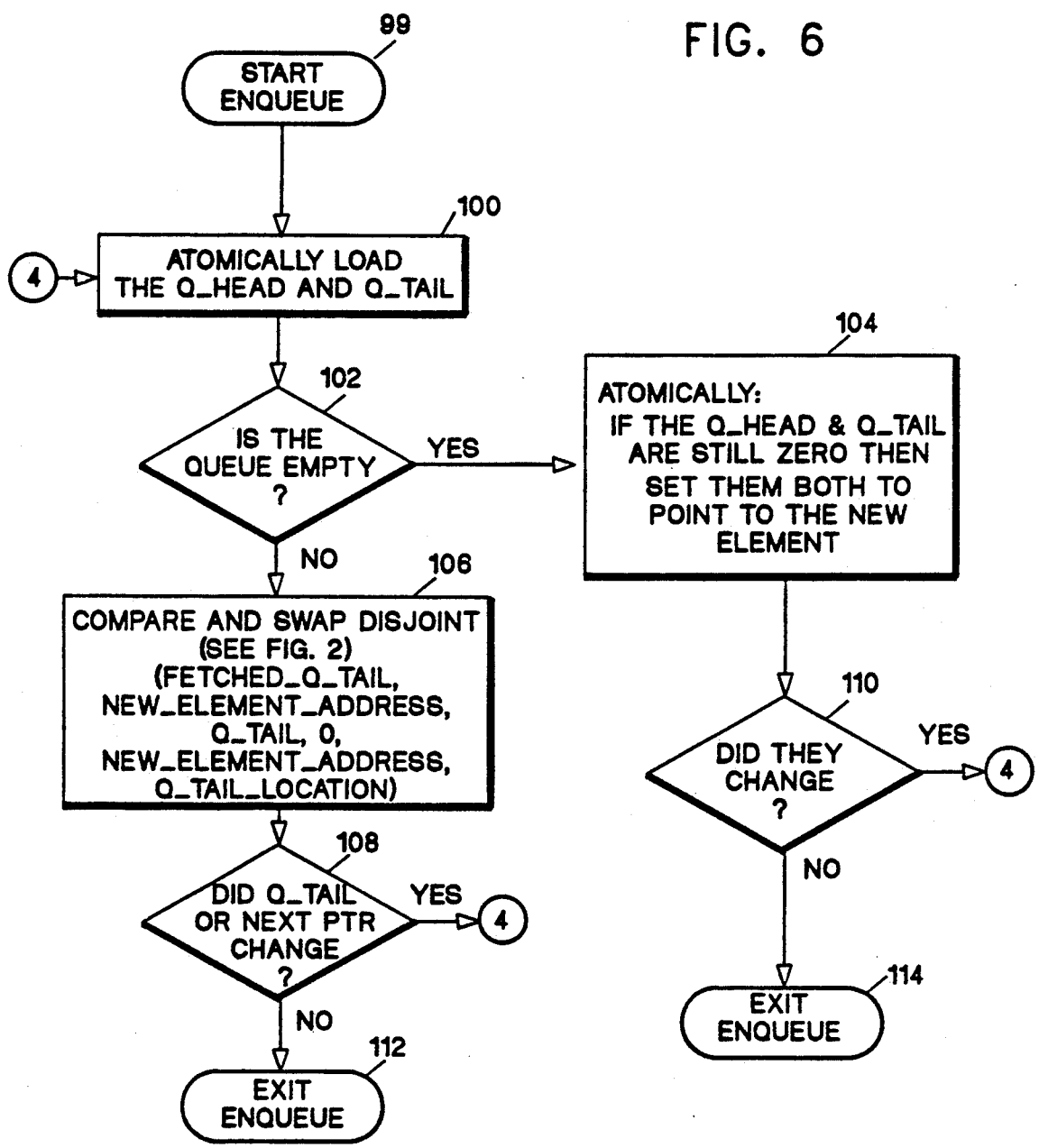
FIG. 6 is a flow diagram showing the method of enqueueing the elements of FIG. 5.

FIG. 6 is a flow chart of this a novel method of enqueueing. The example in this case is to add an element to a double-headed FIFO list as illustrated schematically in FIG. 5. The detailed set of instructions relating to the flow diagram of FIG. 6 are in the second part of Table 2.

As shown in block 100, the Q_head and the Q_tail pointers are fetched atomically. In decision block 102 the Q_head is tested to determine whether the queue is empty. If the queue is not empty, the program proceeds to block 106 where a new element is added to a nonempty list. The address of the Q_tail and the address of the new element is established. A register means is used to ensure that the last element stays as the last element in the queue. The program next proceeds to decision block 108 where a decision is made whether the Q_tail or the next pointer have changed. If neither has changed, the program exits the enqueue routine. If the Q_tail or next pointer has changed, the program returns to block 100 and the program begins again at that point. If neither the Q_tail nor the next pointer changed, that means that a new element has been successfully added to the queue and the program exits enqueue as shown in block 112.

If the result from decision block 108 indicates that the Q_tail or the next pointer of the last element has changed since being fetched, the process must start again at block 100. If the answer is no, the queueing process is complete and the program is exited at block 112.

Returning now to block 102, if the queue is empty, the program proceeds to block 104. A new element is added, and both the Q_head and Q_tail pointers point to the new element as shown in block 104. As shown in the flow diagram, this step is done atomically as the word has been defined in this specification.

In block 110, a decision is made as to whether contents of the Q_head and Q_tail have changed since pointing to the new element. As shown in decision block 110, if they have not changed, the program exits the enqueue routine. If the Q_tail or the next pointer of the last element did change, the program returns to block 100 to start the procedure again.

To recapitulate, block 106 represents the CSD instruction, which ensures that while the Q_tail pointer still points to element C, the CSD instruction compares register operand 1 with location operand 3. If they are equal, the program replaces the value in location operand 3 with the value in register operand 2. If they are not equal, then register operand 1 gets the value at location operand 3 and the condition code is set.

Note what the CSD instruction does in comparison with the CS and its companion compare double and swap instructions. Compare and Swap and Compare Double and Swap compares and replaces one location, either a fullword or a doubleword respectively at that one location. CSD and its companion Compare Double and Swap Disjoint will conditionally replace two disjoint elements, either a fullword or a doubleword, respectively at two disjoint locations. Compare and Swap compares only one storage location and replaces that storage conditionally whereas Compare and Swap Disjoint will compare one location, then compare a second location conditional on the equality of the first location; if both of the quality conditions are met, then both locations are replaced. The advantage of this is that one can manipulate both the queue or stack and also the first element in the list at the same time while maintaining list integrity (absence of list integrity means that an element could be lost, for example).

LIST MANIPULATION OF A STACK (A LIFO LIST)

Figure 7:
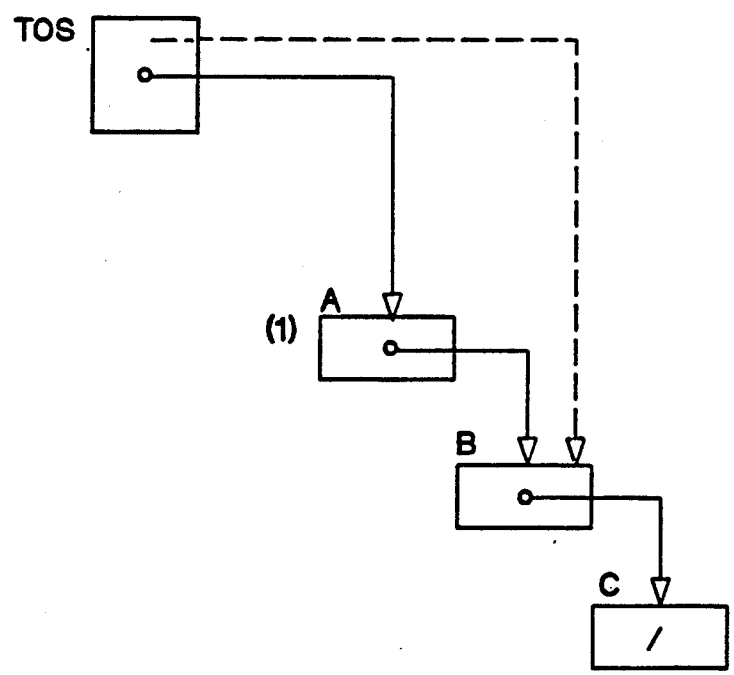
FIG. 7 illustrates a LIFO queue list and the result obtained after the manipulation of the list by my invention.

FIG. 7 illustrates the removal of an element from a Stack, where the process removes element A from the stack.

The stack is defined as having a TOS (Top of Stack pointer). The elements are added to the TOS and taken off from the TOS.

Given a Stack represented by a top of stack pointer (TOS) and a representative selection of elements A, B and C which were pushed onto the stack in the order of C, B, A, to remove (or pop) the first element from the stack you replace the value in the top of stack with the address of B, the second element in the stack, and return the value of the address of A.

My technique allows multiple processes to POP (remove from the stack) elements concurrently, without having to hold a lock, or wait on an ECB and all without any possibility that the Stack will be corrupted. The technique is described in Table 3 and in FIG. 18.

TABLE 3

| Assume the following declarations: | | | |
|---|---|---|---|
| 1. STACK | DS | 0F | |
| 2. TOS | DC | A(0) | Pointer to the top of the stack |
| 3. * | | | |
| 4. ELEMENT | DSECT | | A Stack Element |
| 5. NEXT | DS | A | Pointer to the next element on the stack |
| 6. ELEMENTL | EQU | *-ELEMENT | Length of ELEMENT |
| 7. * | | | |
| 8. NEWELEM | DS | CL(ELEMENTL) | A new element to add to the Stack |
| POPing an Element from the STACK. (Refer to FIG. 8 for the flow diagram.) | | | |
| 1. POP | L | R2,TOS | Get the TOS |
| 2. POP1 | LTR | R2,R2 | Any elements? |
| 3. | BZ | POPEXIT | No, so exit |
| 4. | CAL | R2,TOS,R4,NEXT-ELEMENT(R2) R2←TOS,R4←TOS@NEXT | |
| 5. | BC | 4,POP1 | TOS changed, try again |
| 6. POP2 | LR | R3,R4 | The pointer to the next element |
| 7. | SLR | R5,R5 | TOS@NEXT will get zero |
| 8. | CSD | R2,Tos,R4,NEXT-ELEMENT(R2) | Update pointers |
| 9. | BC | 4,POP1 | R2 = TOS, try again |
| 10. | BC | 2,POP2 | R4 = Next, try again |
| 11. | BNE | POP | It didn't work, try again |

TABLE 3-continued

Assume the following declarations:

| | | | |
|---|---|---|---|
| 12. POPEXIT | DS | OH | IF POPed →R2=Element ELSE R2=0 |

Figure 8:
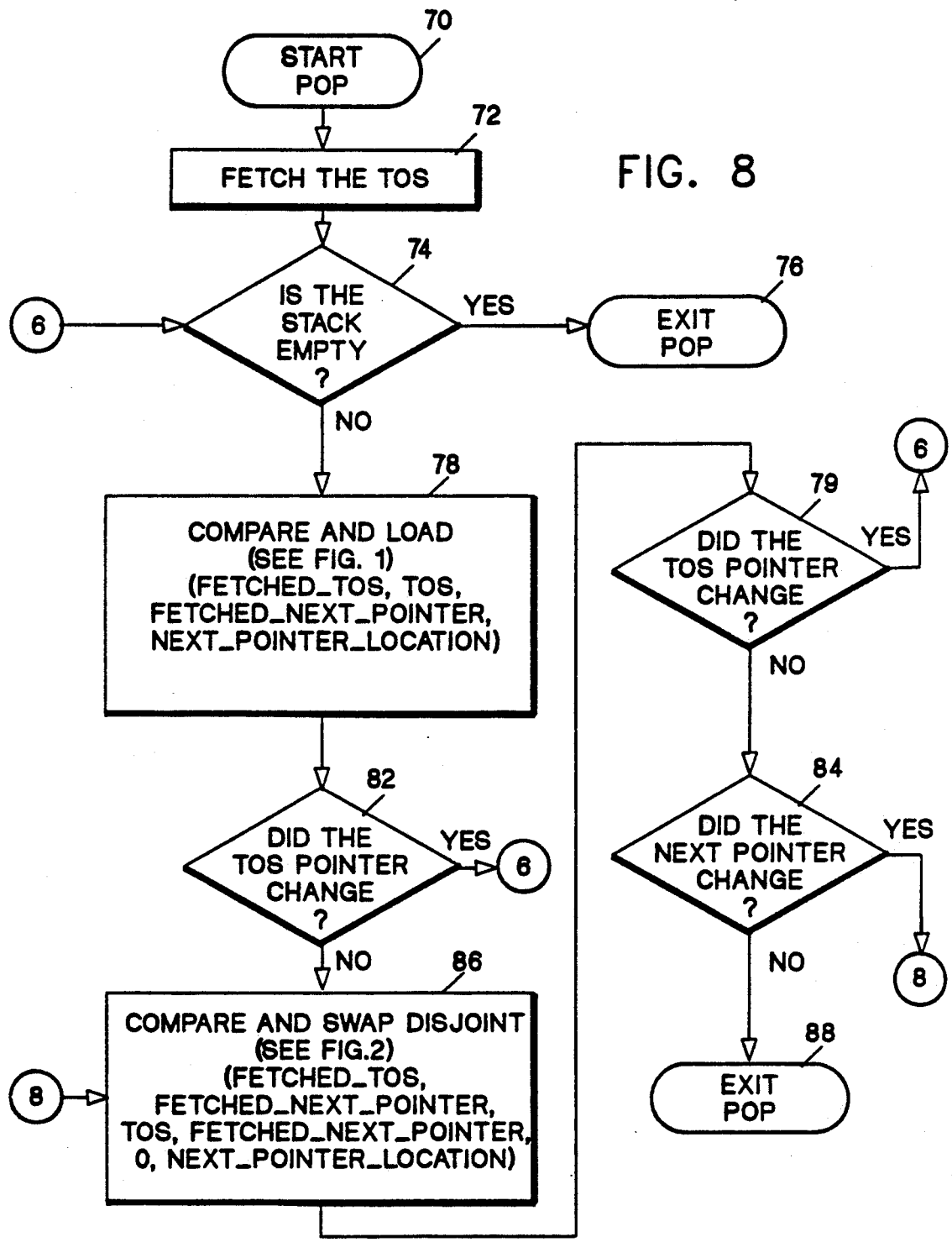
FIG. 8 is a flow diagram illustrating the method according to my invention of deleting an element from the stack shown in FIG. 7.

FIG. 8 is a flow chart of removing an element from a LIFO list. In the first step the address of the top of the stack (TOS) is fetched as shown in block 72. In decision block 74 the top of the stack is tested to determine whether it is empty or has a value. If the stack is empty, the POP program is exited at 76 since there is nothing to remove.

However, if the stack is not empty, the Compare and Load (CAL) instruction in block 78 is used to fetch the value of the next pointer from the newest element while making sure that the top of the stack (TOS) does not change. If the TOS had changed, as decided in block 82, the program returns to decision block 74.

If the TOS did not change, the program proceeds with the Compare and Swap Disjoint (CSD) instruction as shown in block 86. The TOS replacement value is set to the value of the next pointer which had been fetched by the CAL instruction in block 78. In block 86 the replacement value for the next field is set to zero. While making sure the TOS and the next field do not change, the value of the TOS is replaced with the value of the next pointer and the value of the next pointer is then replaced with zero by the CSD instruction.

A decision is made in decision block 79 as to whether the TOS pointer had changed. If the answer is yes, the program returns to decision block 74. If the answer is no, a decision is made in block 84 whether the next pointer had changed. If the answer is yes, the program returns to the Compare and Swap Disjoint instruction. If the answer from block 84 is no, the POP routine is exited as shown in block 88. The program exits either with zero or the address of the element.

Although the foregoing invention has been particularly shown and described with reference to the preferred embodiment thereof, it will be understood by those skilled in the art that other changes in form may be made without departing from the spirit and scope of the invention. For example, the novel instructions can be used on other than IBM System 370 architecture. In addition, the novel instructions may be used in processes and apparatus which perform various method of data processing.

I claim:

1. In a multitasking data processing system which includes a plurality of users each of which may require shared access to the same data in a memory, a method of removing an element from a queue stored in the memory, wherein the queue is associated with a queue tail marking the newest element in the queue and a queue head marking the oldest element in the queue and each queue element contains a pointer to the next element in the queue, comprising the steps of:
   a) placing the value of the queue head into a first operand,
   b) placing the address of the queue head into a second operand,
   c) placing the address of the next element pointer of the first element into a fourth operand,
   d) executing a first prescribed computer instruction which performs the steps of
   e) locking access to the memory location specified by the second operand,
   f) comparing the first operand with the contents of memory specified by the second operand,
   g) if the comparison is equal, loading into a third operand the next queue element pointer specified by the fourth operand,
   h) releasing the lock on the memory location specified by the second operand, and
   i) setting a return code indicating success or failure of loading the next queue element pointer specified by the fourth operand, and thereafter
   j) if the return code indicates that the first prescribed instruction was not successful, repeating the above steps,
   k) if the return code indicates that the first prescribed instruction was successful, removing the oldest element from the queue using the next element pointer obtained in step g).

2. The method of claim 1 wherein the step of removing the oldest element from the queue further comprises
   l) if more than one element is on the queue, executing a second prescribed computer instruction, wherein the second instruction performs the steps of
   m) locking access to the memory at the locations specified by the second and fourth operands,
   n) comparing the first operand with the memory contents specified by the second operand,
   o) if the comparison is equal, comparing the third operand with the memory contents specified by the fourth operand,
   p) if the second comparison is also equal, storing new values at the memory locations specified by the second and fourth operands, and
   q) releasing the lock on the memory locations specified by the second and fourth values.

3. The method of claim 2 further comprising the steps of
   if the comparison of the first operand with the memory contents of the second operand by the second instruction is not equal, reloading the first operand and repeating steps d) through q).

4. The method of claim 2 further comprising the steps of
   if the comparison of the third operand with the memory contents of the fourth operand by the second instruction is not equal, reloading the third operand and repeating the steps l) through q).

5. The method of claim 1 further comprising
   if there is only one element on the queue, removing the element and setting the values of the queue tail and the queue head in memory to indicate an empty queue.

6. In a multitasking data processing system which includes a plurality of users each of which may require shared access to the same data in a memory, a method of removing an element from a stack stored in the memory, wherein the stack is associated with a stack pointer marking the newest element in the stack and each stack element contains a pointer to the next element in the stack, comprising the steps of:
   a) placing the value of the stack pointer into a first operand, b) placing the address of the stack pointer into a second operand,
c) placing the address of the next element pointer of the first element into a fourth operand,
d) executing a first prescribed computer instruction which performs the steps of
e) locking access to the memory location specified by the second operand,
g) comparing the first operand with the contents of memory specified by the second operand,
h) if the comparison is equal, loading into the third operand the next stack element pointer specified by the fourth operand,
i) releasing the lock on the memory location specified by the second operand, and
j) setting a return code indicating success or failure of the first prescribed instruction, and thereafter
k) if the return code indicates that the first prescribed instruction was not successful, repeating the above steps,
l) if the return code indicates that the first prescribed instruction was successful, removing from the stack the element pointed to by the stack element pointer using the next stack element pointer obtained from step h).

* * * * *